(12) United States Patent
Kim et al.

(10) Patent No.: US 11,592,938 B2
(45) Date of Patent: Feb. 28, 2023

(54) DISPLAY DEVICE DEACTIVATING TOUCH SENSOR BY IMAGE SYNCHRONIZATION SIGNAL

(71) Applicant: SAMSUNG DISPLAY CO., LTD., Yongin-si (KR)

(72) Inventors: Soo Won Kim, Yongin-si (KR); Ye Rin Oh, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/236,046

(22) Filed: Apr. 21, 2021

(65) Prior Publication Data

US 2022/0083192 A1   Mar. 17, 2022

(30) Foreign Application Priority Data

Sep. 14, 2020   (KR) ........................ 10-2020-0117966

(51) Int. Cl.
| | |
|---|---|
| *G06F 3/041* | (2006.01) |
| *G09G 3/20* | (2006.01) |
| *G09G 3/00* | (2006.01) |
| *G06F 3/044* | (2006.01) |

(52) U.S. Cl.
CPC ........ *G06F 3/04184* (2019.05); *G06F 3/0446* (2019.05); *G09G 3/035* (2020.08); *G09G 3/20* (2013.01); *G06F 2203/04102* (2013.01)

(58) Field of Classification Search
CPC ............... G06F 3/04184; G06F 3/0446; G06F 2203/04102; G06F 3/041; G06F 3/0445; G09G 3/035; G09G 3/20; G09G 3/3275; G09G 3/3225; G02F 1/13338
See application file for complete search history.

(56) References Cited

U.S. PATENT DOCUMENTS

| | | | |
|---|---|---|---|
| 9,972,233 B2 | 5/2018 | Lim | |
| 10,684,714 B2 | 6/2020 | Seo et al. | |
| 2014/0292672 A1* | 10/2014 | Choi | ........................ G06F 3/041 345/173 |

(Continued)

FOREIGN PATENT DOCUMENTS

| | | |
|---|---|---|
| KR | 1020160084910 A | 7/2016 |
| KR | 1020180031886 A | 3/2018 |
| KR | 1020210054111 A | 5/2021 |

*Primary Examiner* — Richard J Hong
(74) *Attorney, Agent, or Firm* — Cantor Colburn LLP

(57) ABSTRACT

A display device includes a display driving controller receiving input image data, a synchronization signal, and a voltage control signal, and generating image data based on the input image data and the synchronization signal, a display panel including pixels disposed on a display area and displaying an image on the display area based on the image data, and a touch sensor including sensing electrodes on a sensing area, and detecting a touch input generated in the sensing area by driving the sensing electrodes. The display driving controller generates a second level of the synchronization signal by changing a voltage level of the synchronization signal having a first level based on the voltage control signal, and provides the synchronization signal having the second level to the touch sensor. The touch sensor deactivates at least a partial area of the sensing area in response to the synchronization signal having the second level.

19 Claims, 16 Drawing Sheets

(56) References Cited

U.S. PATENT DOCUMENTS

| | | | |
|---|---|---|---|
| 2016/0041438 A1* | 2/2016 | Hu | G02F 1/13338 |
| | | | 345/87 |
| 2016/0283036 A1* | 9/2016 | Lee | G06F 3/0445 |
| 2018/0188882 A1* | 7/2018 | Kang | G06F 3/04184 |
| 2020/0357362 A1* | 11/2020 | Shin | G09G 3/3275 |
| 2021/0132719 A1 | 5/2021 | Park et al. | |
| 2022/0077275 A1* | 3/2022 | Jo | G09G 3/3225 |

* cited by examiner

DISPLAY DEVICE DEACTIVATING TOUCH SENSOR BY IMAGE SYNCHRONIZATION SIGNAL

This application claims priority to Korean Patent Application No. 10-2020-0117966, filed Sep. 14, 2020, and all the benefits accruing therefrom under 35 U.S.C. § 119, the content of which in its entirety is herein incorporated by reference.

BACKGROUND

1. Field

Embodiments of the invention relate to a display device.

2. Description of the Related Art

Touch sensors are widely used as input devices of various electronic devices including display devices. A touch sensor may include sensing electrodes provided in a display device and disposed in a sensing area overlapping a display area, for example. The touch sensor may sense a touch input generated in the sensing area using the sensing electrodes.

SUMMARY

Embodiments of the invention provide a display device capable of reducing power consumption.

A display device in an embodiment of the invention may include a display driving controller which receives input image data, a synchronization signal, and a voltage control signal from outside, and generates image data based on the input image data and the synchronization signal, a display panel which includes a plurality of pixels disposed on a display area and displays an image on the display area based on the image data, and a touch sensor which includes a plurality of sensing electrodes disposed on a sensing area, and detects a touch input generated in the sensing area by driving the plurality of sensing electrodes. The display driving controller may generate a second level of the synchronization signal of by changing a voltage level of the synchronization signal having a first level based on the voltage control signal, and provides the synchronization signal having the second level to the touch sensor. The touch sensor may deactivate at least a partial area of the sensing area in response to the synchronization signal having the second level.

In an embodiment, the touch sensor may include an input controller which generates touch driving signals and supplies the touch driving signals to the plurality of sensing electrodes, and a touch panel including the plurality of sensing electrodes. The input controller may detect the touch input based on sensing signals output from the plurality of sensing electrodes in response to the touch driving signals.

In an embodiment, the sensing area may include a first sensing area and a second sensing area, and the input controller may supply the touch driving signals to the plurality of sensing electrodes disposed in the second sensing area in response to the synchronization signal having the second level, and may not supply the touch driving signals to the plurality of sensing electrodes disposed in the first sensing area.

In an embodiment, the display device may further include a synchronization signal line which connects the display driving controller and the touch sensor, and transmits the synchronization signal.

In an embodiment, the display driving controller may include a voltage level controller which is electrically connected to one end of the synchronization signal line, and generates the synchronization signal having the second level by changing the voltage level of the synchronization signal having the first level.

In an embodiment, the voltage level controller may include a plurality of resistors connected in series between an input terminal to which the synchronization signal is input and a ground electrode, and a plurality of switching elements connected between each node between the plurality of resistors and the one end of the synchronization signal line.

In an embodiment, the synchronization signal may be a vertical synchronization signal or a horizontal synchronization signal.

In an embodiment, the input controller may supply the touch driving signals to the plurality of sensing electrodes so as not to overlap with a period in which the synchronization signal is provided to the display driving controller.

In an embodiment, the second sensing area may correspond to an active area that is visually recognized by a user, and the first sensing area may correspond to a non-active area that is not visually recognized by the user.

In an embodiment, the plurality of sensing electrodes may include first sensing electrodes disposed along a first direction, and second sensing electrodes disposed along a second direction different from the first direction. The input controller may supply the touch driving signals to the first sensing electrodes, and detect the touch input based on the sensing signals output from the second sensing electrodes according to a mutual capacitance method or a self-capacitance method between the first sensing electrodes and the second sensing electrodes.

In an embodiment, each of the display panel and the touch sensor may include a flexible substrate.

In an embodiment, the touch sensor may adaptively detect a touch position of the touch input in response to the voltage level of the synchronization signal.

A display device in an embodiment of the invention may include a display driving controller which receives input image data, a synchronization signal, and a voltage control signal from outside, and generates image data based on the input image data and the synchronization signal, a display panel which includes a plurality of pixels disposed on a display area and displays an image on the display area based on the image data, and a touch sensor which includes a plurality of sensing electrodes disposed on a sensing area, and detects a touch input generated in the sensing area by driving the plurality of sensing electrodes. The display driving controller may generate a second level of the synchronization signal by changing a voltage level of the synchronization signal having a first level based on the voltage control signal, and provides the synchronization signal having the second level to the touch sensor. The touch sensor may adaptively detect a touch position of the touch input based on the synchronization signal having the first level or the second level.

In an embodiment, the touch sensor may include an input controller which generates touch driving signals and supplies the touch driving signals to the plurality of sensing electrodes, and a touch panel including the plurality of sensing electrodes. The input controller may detect the touch input based on sensing signals output from the plurality of sensing electrodes in response to the touch driving signals.

In an embodiment, the display device may further include a synchronization signal line which connects the display driving controller and the touch sensor, and transmits the synchronization signal.

In an embodiment, the display driving controller may include a voltage level controller which is electrically connected to one end of the synchronization signal line, and generates the synchronization signal having the second level by changing the voltage level of the synchronization signal having the first level.

In an embodiment, the voltage level controller may include a plurality of resistors connected in series between an input terminal to which the synchronization signal is input and a ground electrode, and a plurality of switching elements connected between each node between the plurality of resistors and the one end of the synchronization signal line.

In an embodiment, the synchronization signal may be a vertical synchronization signal or a horizontal synchronization signal.

In an embodiment, the touch sensor may deactivate at least a partial area of the sensing area in response to the synchronization signal having the second level.

BRIEF DESCRIPTION OF THE DRAWINGS

The accompanying drawings, which are included to provide a further understanding of the inventions, and are incorporated in and constitute a part of this specification, illustrate embodiments of the inventions, and, together with the description, serve to explain principles of the inventions.

DETAILED DESCRIPTION

Figure 1:
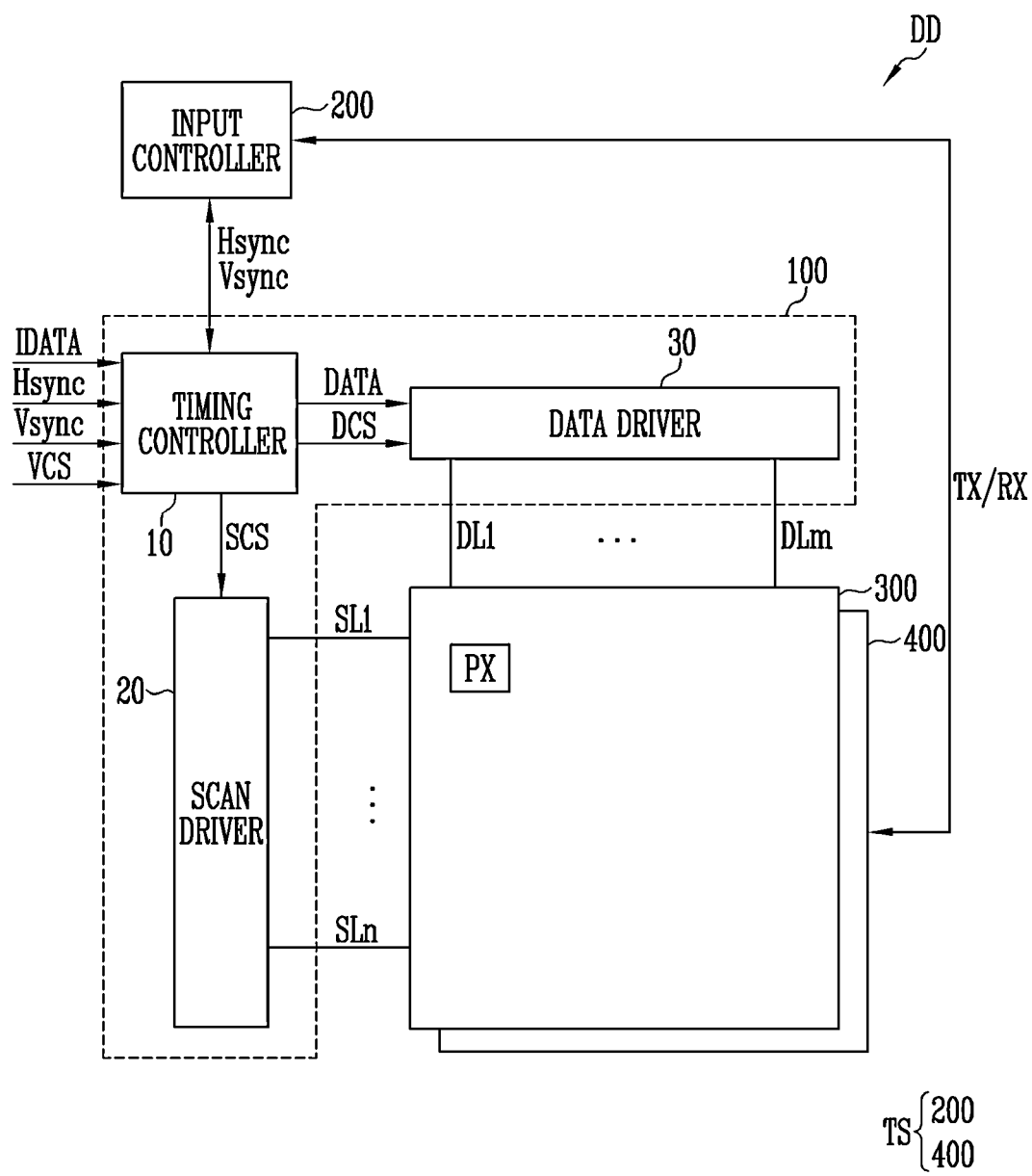
FIG. 1 is a block diagram illustrating an embodiment of a display device according to the invention.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention.

In describing the drawings, similar reference numerals are used for similar element. In the accompanying drawings, the sizes of elements may be shown to be enlarged than the actual for clarity of the invention. It will be understood that, although the terms "first", "second", etc. may be used herein to describe various elements, these elements should not be limited by these terms. These terms are only used to distinguish one element from another element. For instance, a first element discussed below could be termed a second element without departing from the scope of the invention. Similarly, the second element could also be termed the first element. In the invention, the singular forms are intended to include the plural forms as well, unless the context clearly indicates otherwise.

It will be further understood that the terms "comprise", "include", "have", etc. used in the invention, specify the presence of stated features, integers, steps, operations, elements, components, and/or combinations of them but do not preclude the presence or addition of one or more other features, integers, steps, operations, elements, components, and/or combinations thereof.

In addition, when an element is "coupled" to another element, this includes not only a case where the element is directly coupled to the other element, but also a case where another element is coupled between them.

Furthermore, when a first part such as a layer, a film, a region, or a plate is disposed on a second part, the first part may be not only directly on the second part but a third part may intervene between them. In addition, when a first part such as a layer, a film, a region, or a plate is formed on a second part, the surface of the second part on which the first part is formed is not limited to an upper surface of the second part but may include other surfaces such as a side surface or a lower surface of the second part. To the contrary, when a first part such as a layer, a film, a region, or a plate is under a second part, the first part may be not only directly under the second part but a third part may intervene between them.

Hereinafter, preferred embodiments of the invention will be described in detail with reference to the accompanying drawings.

FIG. 1 is a block diagram illustrating an embodiment of a display device according to the invention.

Referring to FIG. 1, a display device DD may include a display driving controller 100, a display panel 300, and a touch sensor TS. Here, the touch sensor TS may include an input controller 200 and a touch panel 400.

In an embodiment, the touch sensor TS may be a capacitive type touch sensor. In an embodiment, the touch sensor TS may be a touch sensor driven in a mutual capacitance method or a self-capacitance method, for example. In another embodiment, the touch sensor TS may be a hybrid capacitive type touch sensor that is selectively driven in the mutual capacitance method or the self-capacitance method according to a driving mode or the like. In addition to the capacitive type touch sensor, the touch sensor TS may be various types of known touch sensors.

The display driving controller 100 and the input controller 200 may be configured as integrated circuits including circuit elements for driving the display panel 300 and the touch panel 400, respectively. In an embodiment, the display driving controller 100 and the input controller 200 may be manufactured in the form of separate chips or may be integrated into a single chip.

In an embodiment, the display panel 300 and the touch panel 400 may be integrally manufactured and/or provided.

In an embodiment, the touch panel 400 may be formed inside the display panel 300 together with pixels PX, or on at least one surface (e.g., an upper surface and/or a lower surface) of the display panel 300, for example. In another embodiment, the display panel 300 and the touch panel 400 may be separately manufactured and/or provided. In an embodiment, the touch panel 400 may be manufactured separately from the display panel 300 and attached on at least one surface of the display panel 300 by a transparent adhesive or the like, for example.

The display panel 300 may include a display area, and the touch panel 400 may include a sensing area. The display area may be an area in which an image is displayed by the display panel 300, and the sensing area may be an area in which a user's input (e.g., a touch input) may be sensed by the touch panel 400. Also, the display panel 300 and the touch panel 400 may further include a peripheral area. The peripheral area may be a remaining area except for the display area and/or the sensing area. In an embodiment, the peripheral area may be an outer area surrounding the display area and/or the sensing area, for example. Wires and/or pads connected to the pixels PX in the display area and/or sensing electrodes in the sensing area may be disposed in the peripheral area.

The display area and the sensing area may overlap each other. In an embodiment, at least one area of the display area may be set as the sensing area, for example. However, the invention is not limited thereto, and the display area and the sensing area may not overlap each other.

In an embodiment, depending on the driving mode, at least a partial area of each of the display area and the sensing area may be set as an active area, and the remaining area may be set as a non-active area. In an embodiment, an area that is not visually recognized by the user may be set as the non-active area, for example. Here, the driving mode may be divided into a first mode in which at least a partial area of each of the display area and the sensing area is set as the active area and the remaining area is set as the non-active area, and a second mode in which the entire area of each of the display area and the sensing area is set as the active area. However, the invention is not limited thereto.

In the first mode, the display driving controller 100 may not drive (that is, deactivate) an area corresponding to the area set as the non-active area among the display area of the display panel 300. In an embodiment, the display driving controller 100 may supply a data signal only to the area set as the active area among the display area, and may not supply the data signal to the area set as the non-active area, for example.

In addition, in the first mode, the input controller 200 may not drive (that is, deactivate) an area corresponding to the area set as the non-active area among the sensing area of the touch panel 400. In an embodiment, the input controller 200 may provide a touch driving signal only to the area set as the active area among the sensing area, and may not provide the touch driving signal to the area set as the non-active area, for example.

Accordingly, the image may not be displayed in the area set as the non-active area and the touch input may not be sensed.

In an embodiment, when the display device DD is implemented as a flexible display device or a slidable (or rollable) display device, a portion of the display panel 300 and the touch panel 400 may be inserted into a housing according to the user's control (the first mode), for example. Here, as the portion of the display panel 300 and the touch panel 400 is inserted into the housing, the corresponding area may not be visually recognized by the user, and thus may be set as the non-active area.

In another embodiment, when the display device DD is implemented as a foldable display device, when the display device DD is out-folded according to the user's control, the area that is not visually recognized by the user due to the folding operation may be set as the non-active area (the first mode).

In the second mode, the display driving controller 100 may drive the entire display area of the display panel 300, and the input controller 200 may drive the entire sensing area of the touch panel 400.

As described above, the display device DD in the embodiments of the invention may deactivate the display panel 300 and the touch panel 400 corresponding to the area set as the non-active area according to the driving mode. Accordingly, power consumption may be reduced when displaying the image and sensing the touch input.

The display panel 300 may include the pixels PX. Each pixel PX may be connected to a corresponding data line and a corresponding scan line. Each pixel PX may receive voltages of a first power source and a second power source from outside. Here, the first power source and the second power source may be voltages desired for operation of the pixels PX. In an embodiment, the first power source may have a voltage level higher than that of the second power source, for example.

Each of the pixels PX may include a driving transistor and at least one switching transistor. Each of the pixels PX may emit light with a luminance corresponding to a data signal provided through the corresponding data line in response to a scan signal provided through the corresponding scan line.

In an embodiment, the display driving controller 100 may include a timing controller 10, a scan driver 20, and a data driver 30.

The timing controller 10 may receive input image data IDATA and a control signal from the outside. Here, the control signal may include a synchronization signal (a vertical synchronization signal Vsync and a horizontal synchronization signal Hsync), a voltage control signal VCS, a clock signal, a data enable signal, and the like.

The timing controller 10 may generate a scan control signal SCS and a data control signal DCS in response to the control signal. The scan control signal SCS may be supplied to the scan driver 20 and the data control signal DCS may be supplied to the data driver 30.

The timing controller 10 may generate image data DATA by converting the input image data IDATA. In an embodiment, the timing controller 10 may generate the image data DATA by rearranging the input image data IDATA. The image data DATA may be supplied to the data driver 30, for example.

In an embodiment, the timing controller 10 may change a voltage level of the vertical synchronization signal Vsync and/or the horizontal synchronization signal Hsync based on the voltage control signal VCS, and supply the changed vertical synchronization signal Vsync and/or the horizontal synchronization signal Hsync to the input controller 200.

The scan driver 20 may supply scan signals to the pixels PX through scan lines SL1 to SLn in response to the scan control signal SCS, where n may be an integer greater than 0.

The data driver 30 may convert the image data DATA in digital form into data signals in analog form in response to the data control signal DCS, and supply the data signals to the pixels PX through data lines DL1 to DLm, where m may be an integer greater than 0.

The touch panel 400 may include a touch sensor layer including sensing electrodes. The touch sensor layer may be configured as a single layer or multiple layers including the sensing electrodes and/or wires connected thereto. The sensing electrodes may be disposed on the sensing area of the touch sensor layer and may be driven by the input controller 200. In an embodiment, when the sensing electrodes are driven in response to a touch driving signal TX provided from the input controller 200, the touch input generated in the sensing area may be detected, for example. Here, in a broad sense, the touch input may mean both a touch input according to an actual contact and a touch input according to hovering.

The input controller 200 may supply the touch driving signal TX to the sensing electrodes of the touch panel 400 and receive a sensing signal RX output from the sensing electrodes by the touch driving signal TX. The input controller 200 may analyze the sensing signal RX to detect whether the touch input has occurred and/or a position of the touch input.

When a period in which the scan signal and the data signal are supplied to the display panel 300 and a period in which the touch driving signal TX is supplied to the touch panel 400 overlap each other, noise may occur between the respective signals. The touch input may not be accurately detected due to such noise.

The input controller 200 may determine a section in which the display driving controller 100 provides the scan signal and the data signal to the display panel 300 based on the vertical synchronization signal Vsync and/or the horizontal synchronization signal Hsync provided from the display driving controller 100 (or timing controller 10), and provide the touch driving signal TX to the touch panel 400 by avoiding the section. That is, the input controller 200 may provide the touch driving signal TX to the touch panel 400 so as not to overlap the section in which the scan signal and the data signal are supplied. Accordingly, the touch input may be accurately detected.

In an embodiment, the input controller 200 may turn off at least some of the sensing electrodes of the touch panel 400 based on the voltage level of the vertical synchronization signal Vsync and/or the horizontal synchronization signal Hsync. The input controller 200 may determine the area set as the non-active area among the sensing area based on the voltage level of the vertical synchronization signal Vsync and/or the horizontal synchronization signal Hsync, and turn off the sensing electrodes corresponding to the non-active area. In an embodiment, the input controller 200 may not provide the touch driving signal TX to at least some of the sensing electrodes (or sensing electrodes corresponding to the non-active area), for example.

The input controller 200 may determine the non-active area corresponding to the voltage level of the vertical synchronization signal Vsync and/or the horizontal synchronization signal Hsync based on previously stored data (e.g., a look-up table or the like). However, the invention is not limited thereto. In an embodiment, the input controller 200 may determine the area set as the non-active area among the sensing area using a separate algorithm that determines the non-active area based on the voltage level of the vertical synchronization signal Vsync and/or the horizontal synchronization signal Hsync, for example.

Figure 2:
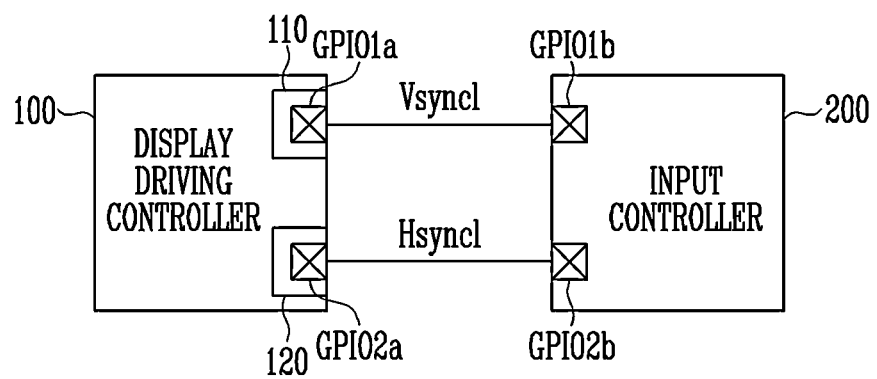
FIG. 2 is a diagram illustrating an embodiment of a display driving controller and an input controller included in the display device of FIG. 1.
Figure 3:
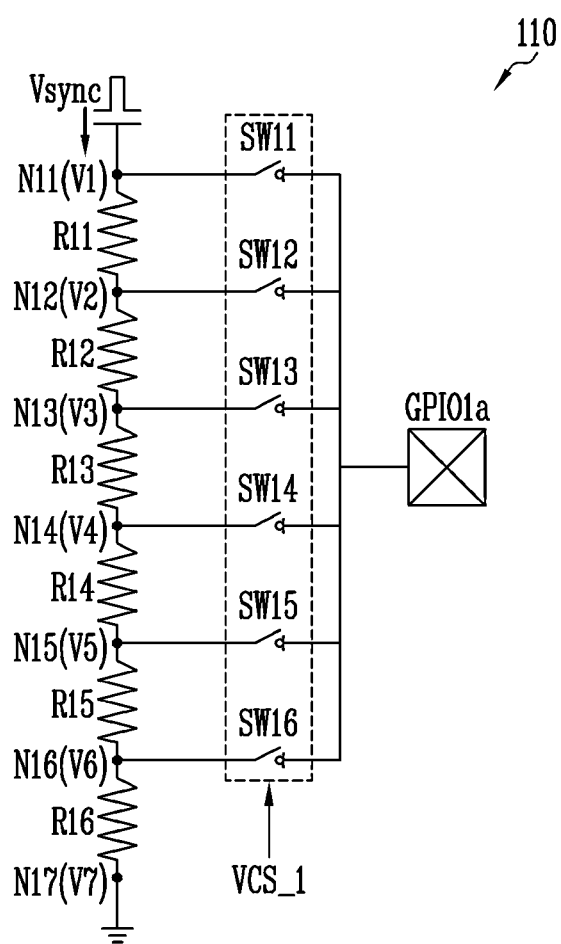
FIG. 3 is a diagram illustrating an embodiment of a first voltage level controller included in the display driving controller of FIG. 2.
Figure 4:
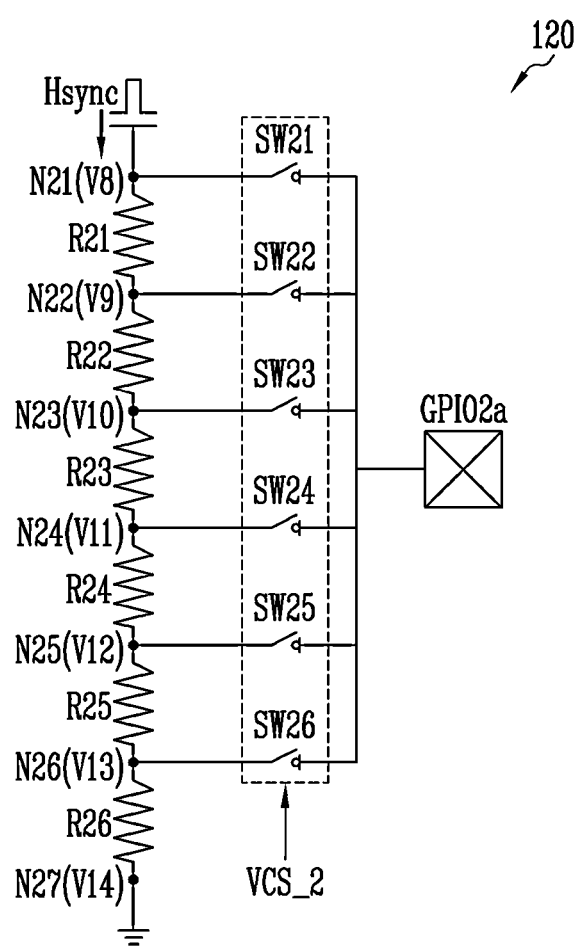
FIG. 4 is a diagram illustrating an embodiment of a second voltage level controller included in the display driving controller of FIG. 2.

FIG. 2 is a diagram illustrating an embodiment of a display driving controller and an input controller included in the display device of FIG. 1. FIG. 3 is a diagram illustrating an embodiment of a first voltage level controller included in the display driving controller of FIG. 2. FIG. 4 is a diagram illustrating an embodiment of a second voltage level controller included in the display driving controller of FIG. 2.

Referring to FIGS. 1 and 2, the display driving controller 100 and the input controller 200 may be interconnected through synchronization signal lines. The display driving controller 100 may supply the vertical synchronization signal Vsync and the horizontal synchronization signal Hsync to the input controller 200 through the synchronization signal lines. Here, the synchronization signal lines may include a vertical synchronization signal line Vsyncl and a horizontal synchronization signal line Hsyncl.

In an embodiment, each of the vertical synchronization signal line Vsyncl and the horizontal synchronization signal line Hsyncl may be connected in such a manner that input/output pins GPIO1 and GPIO2 disposed at both ends are coupled to the display driving controller 100 and the input controller 200, respectively. In an embodiment, an input pin GPIO1$a$ of the vertical synchronization signal line Vsyncl may be connected to the display driving controller 100, and an output pin GPIO1$b$ of the vertical synchronization signal line Vsyncl may be connected to the input controller 200, for example. Also, an input pin GPIO2$a$ of the horizontal synchronization signal line Hsyncl may be connected to the display driving controller 100, and an output pin GPIO2$b$ of the horizontal synchronization signal line Hsyncl may be connected to the input controller 200.

In an embodiment, the display driving controller 100 may change the voltage level of the vertical synchronization signal Vsync and/or the horizontal synchronization signal Hsync using a voltage level controller. In an embodiment, the display driving controller 100 may include a first voltage level controller 110 for changing the voltage level of the vertical synchronization signal Vsync and a second voltage level controller 120 for changing the voltage level of the horizontal synchronization signal Hsync, for example.

The first voltage level controller 110 may be electrically connected to the input pin GPIO1$a$ of the vertical synchronization signal line Vsyncl. The second voltage level controller 120 may be electrically connected to the input pin GPIO2$a$ of the horizontal synchronization signal line Hsyncl.

Referring further to FIG. 3 to specifically describe the operation of changing the voltage level of the first voltage level controller 110, the first voltage level controller 110 may include a plurality of switching elements SW11 to SW16 and a plurality of resistors R11 to R16 for changing the voltage level of the vertical synchronization signal Vsync. In FIG. 3, each of the plurality of switching elements SW11 to SW16 and the plurality of resistors R11 to R16 is shown as six. However, this is merely an example, and the number of the switching elements SW11 to SW16 and the resistors R11 to R16 in the invention is not limited thereto.

In an embodiment, the plurality of resistors R11 to R16 may be connected in series between a first node N11 and a seventh node N17. Here, the first node N11 may be connected to an input terminal to which the vertical synchronization signal Vsync supplied from the outside is input, and the seventh node N17 may be connected to a ground electrode. The first voltage level controller 110 may generate a plurality of voltages V1 to V7 using voltage distribution by the plurality of resistors R11 to R16. In an embodiment, the first voltage level controller 110 may generate a first voltage V1 corresponding to the voltage level of the vertical synchronization signal Vsync supplied from the outside, a seventh voltage V7 corresponding to the voltage level (e.g., 0 volt (V)) of the ground electrode, and second to sixth voltages V2 to V6 between the first voltage V1 and the seventh voltage V7 through the voltage distribution, for example. The plurality of resistors R11 to R16 may have the same resistance value, but the invention is not limited thereto.

Each of the plurality of switching elements SW11 to SW16 may be connected between each of nodes N11 to N16 between the plurality of resistors R11 to R16 and the input pin GPIO1a of the vertical synchronization signal line Vsyncl.

In an embodiment, a first switching element SW11 may be connected between the first node N11 and the input pin GPIO1a, a second switching element SW12 may be connected between a second node N12 and the input pin GPIO1a, a third switching element SW13 may be connected between a third node N13 and the input pin GPIO1a, a fourth switching element SW14 may be connected between a fourth node N14 and the input pin GPIO1a, a fifth switching element SW15 may be connected between a fifth node N15 and the input pin GPIO1a, and a sixth switching element SW16 may be connected between a sixth node N16 and the input pin GPIO1a, for example.

In an embodiment, one of the plurality of switching elements SW11 to SW16 may be turned on based on a voltage control signal VCS_1. Accordingly, the input pin GPIO1a of the vertical synchronization signal line Vsyncl may be connected to one of the first to sixth nodes N11 to N16. Accordingly, one of the first to sixth voltages V1 to V6 may be provided to the input pin GPIO1a of the vertical synchronization signal line Vsyncl.

In this way, the first voltage level controller 110 may change the voltage level of the vertical synchronization signal Vsync supplied from the outside using the plurality of switching elements SW11 to SW16 and the plurality of resistors R11 to R16, and provide the vertical synchronization signal Vsync whose voltage level is changed to the input controller 200 through the vertical synchronization signal line Vsyncl.

The configuration of the circuit of the second voltage level controller 120 and the operation of changing the voltage level of the horizontal synchronization signal Hsync may be substantially the same or similar to the configuration of the circuit of the first voltage level controller 110 and the operation of changing the voltage level of the vertical synchronization signal Vsync.

In an embodiment, referring to FIG. 4, the second voltage level controller 120 may include a plurality of resistors R21 to R26 connected in series between an eighth node N21 connected to an input terminal to which the horizontal synchronization signal Hsync supplied from the outside is input and a fourteenth node N27 connected to the ground electrode, and a plurality of switching elements SW21 to SW26 connected between each of eighth to thirteenth nodes N21 to N26 and the input pin GPIO2a of the horizontal synchronization signal line Hsyncl, for example. One of the plurality of switching elements SW21 to SW26 may be turned on based on a voltage level control signal VCS_2. Accordingly, one of eighth to thirteenth voltages V8 to V13 corresponding to the eighth to thirteenth nodes N21 to N26, respectively, may be input to the input pin GPIO2a of the horizontal synchronization signal line Hsyncl.

In this way, the display driving controller 100 may provide the vertical synchronization signal Vsync and the horizontal synchronization signal Hsync whose voltage levels are changed by the first voltage level controller 110 and the second voltage level controller 120 to the input controller 200. In addition, as described with reference to FIG. 1, the input controller 200 may determine the non-active area based on the voltage level of the vertical synchronization signal Vsync and/or the horizontal synchronization signal Hsync, and turn off at least some of the sensing electrode of the touch panel 400 corresponding to the non-active area.

Figure 5:
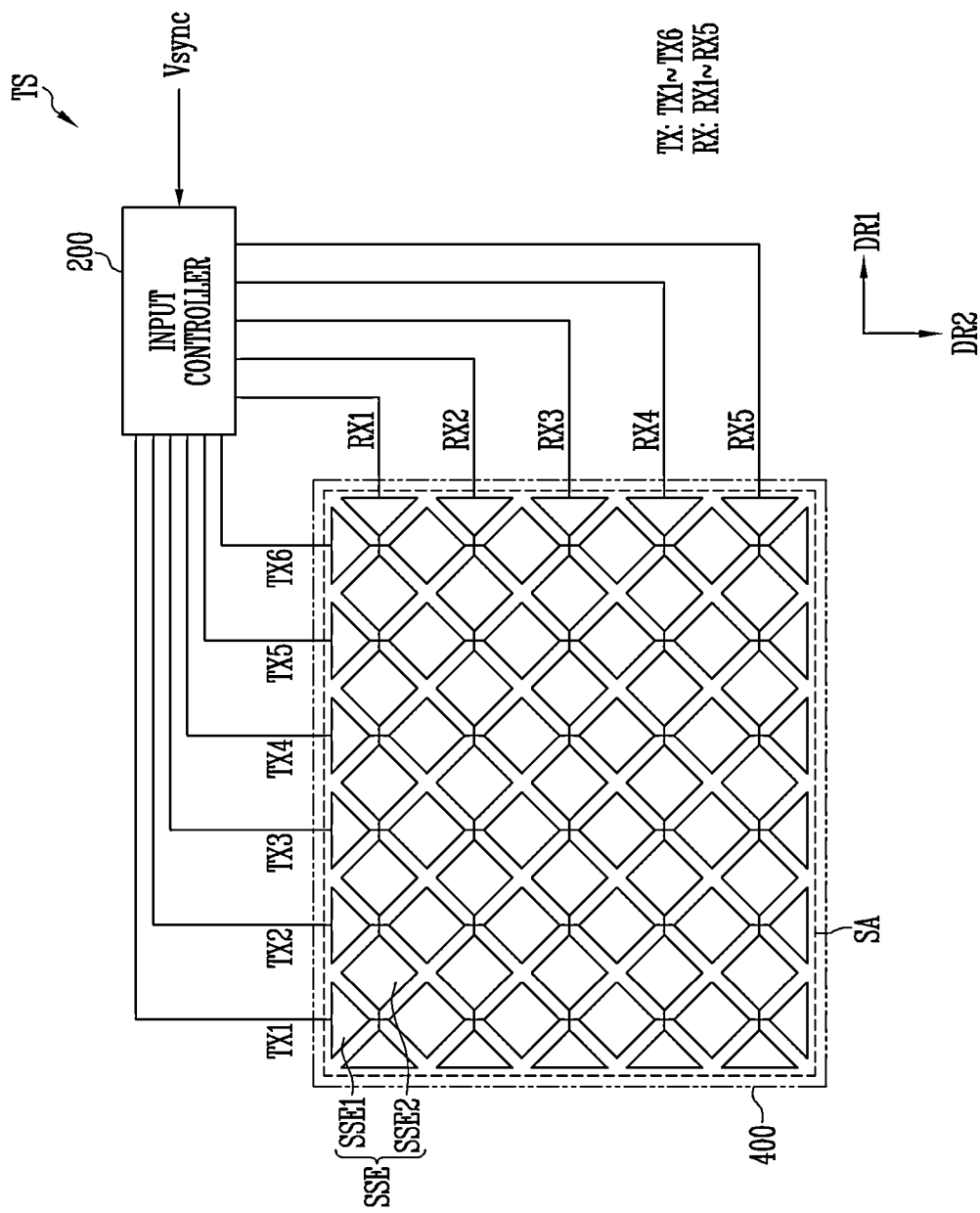
FIG. 5 is a diagram illustrating an embodiment of a touch sensor according to the invention.
Figure 6A:
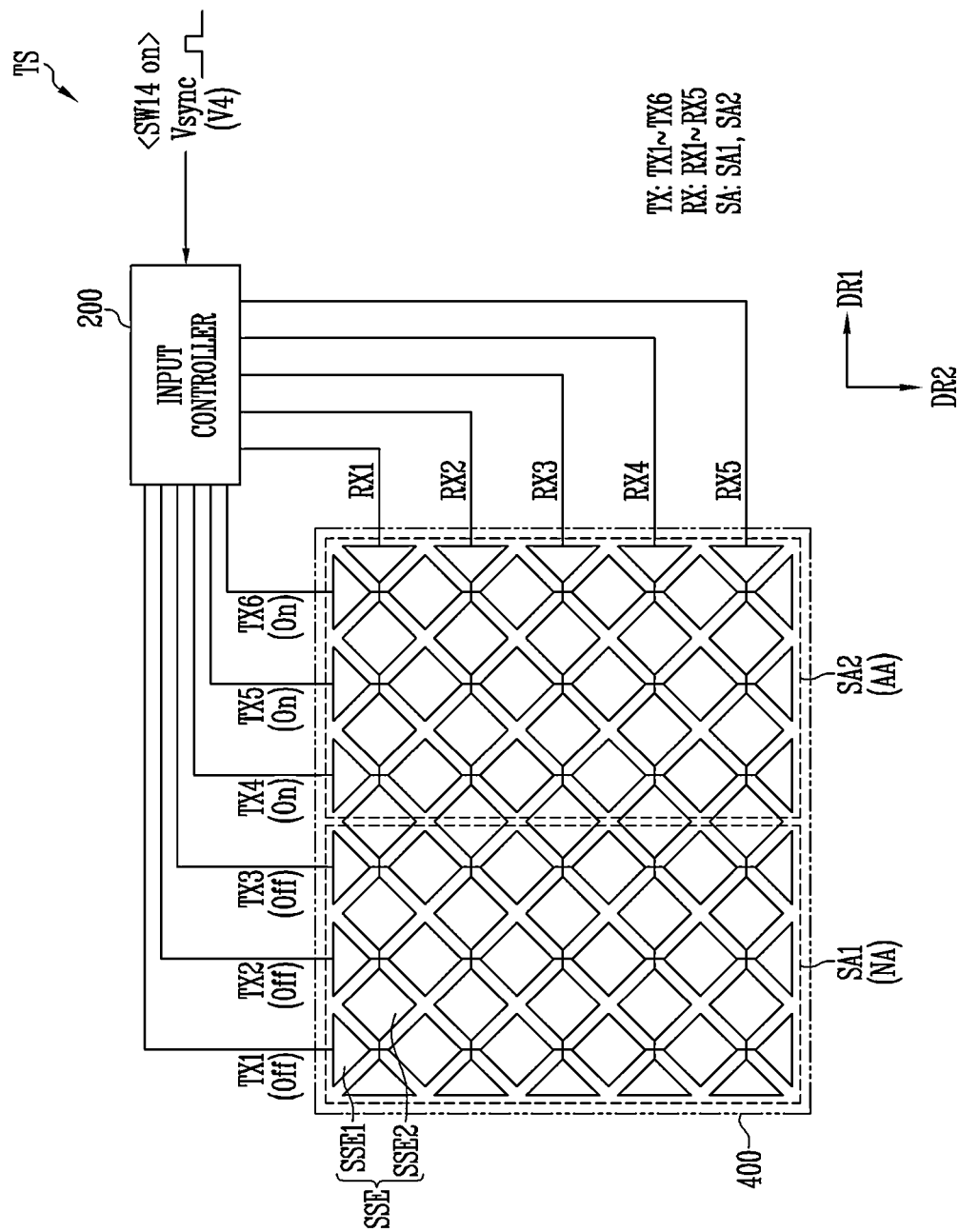
FIGS. 6A and 6B are diagrams for explaining an embodiment of an operation of the touch sensor of FIG. 5.
Figure 6B:
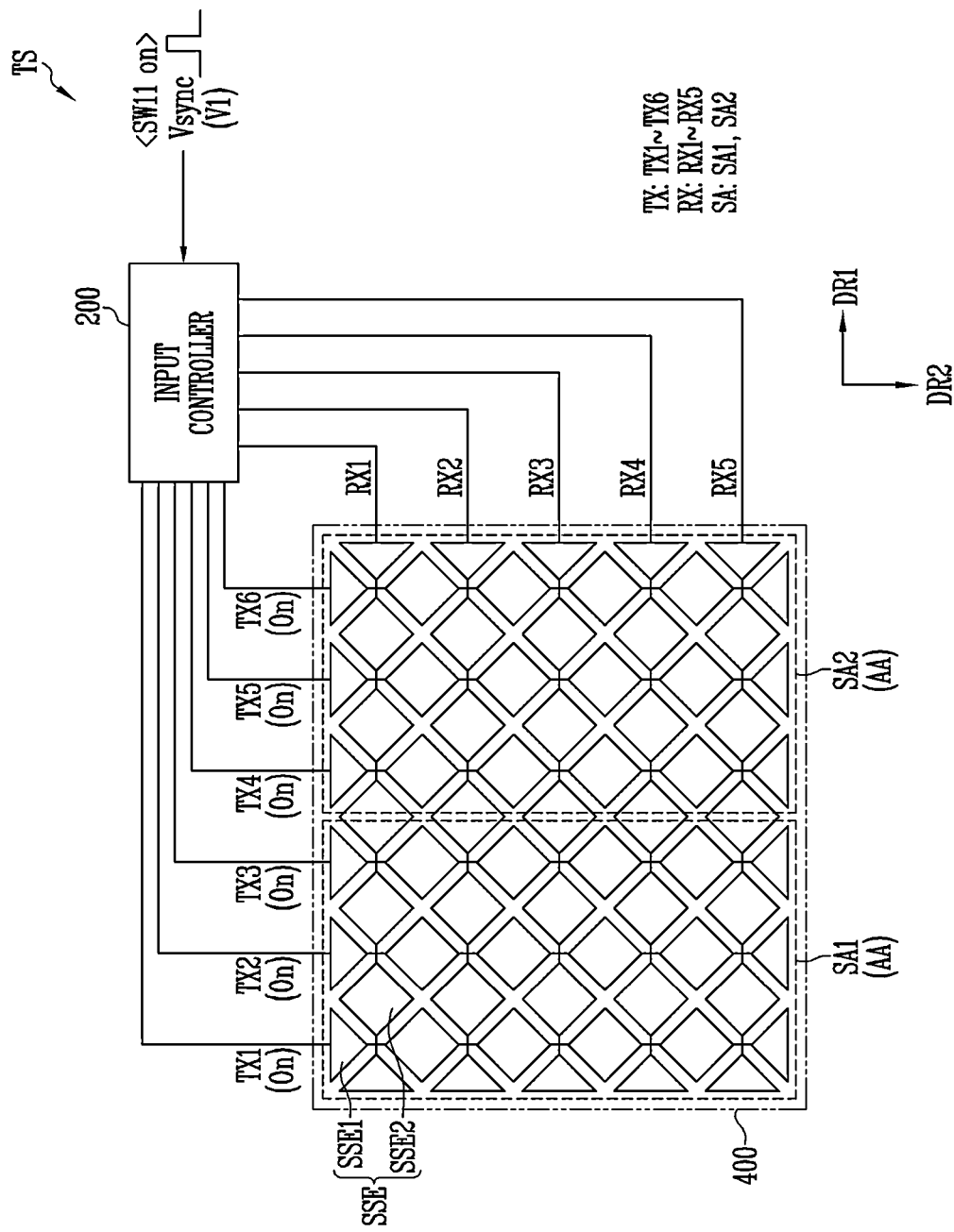
Figure 7A:
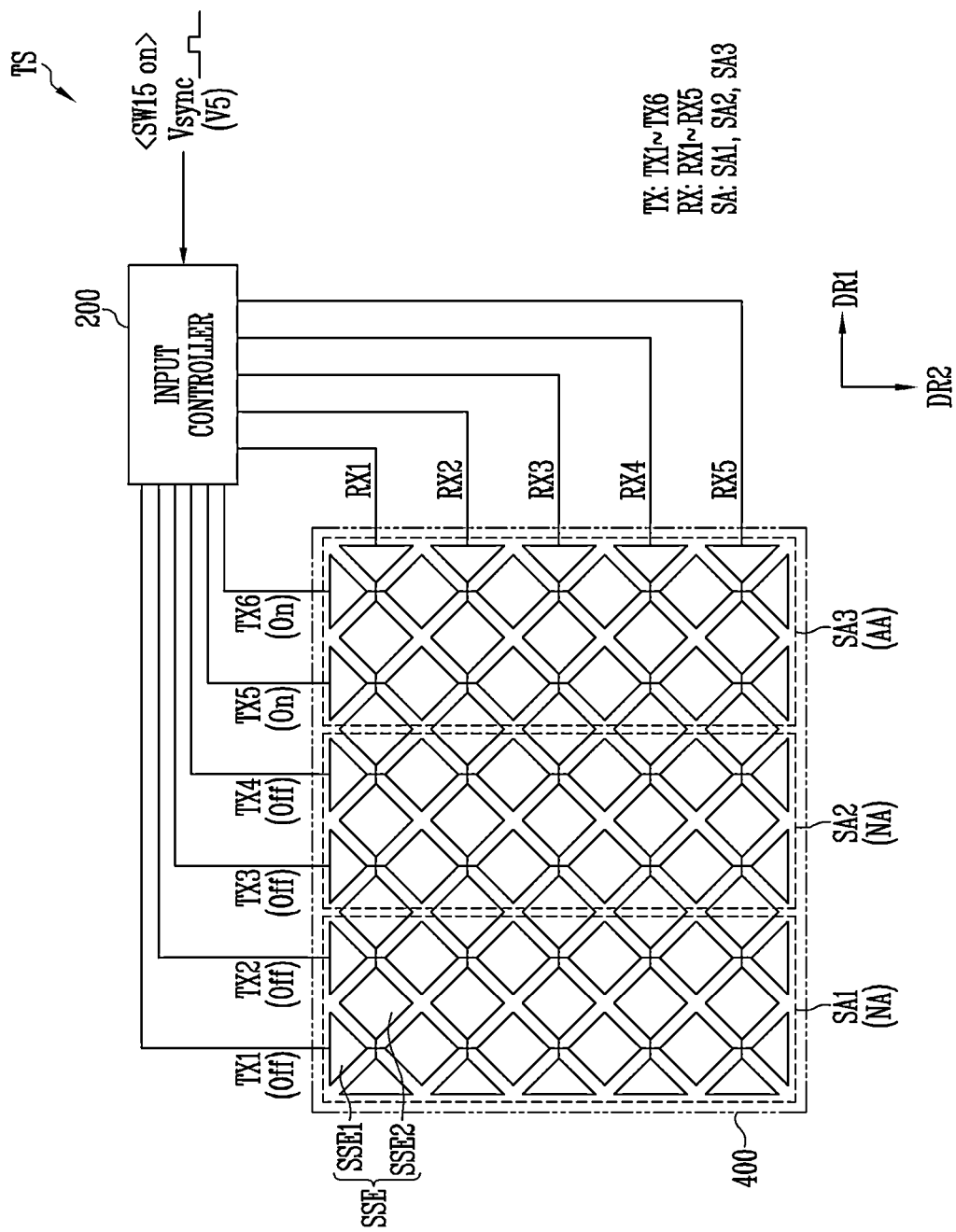
FIGS. 7A to 7C are diagrams for explaining another embodiment of an operation of the touch sensor of FIG. 5.
Figure 7B:
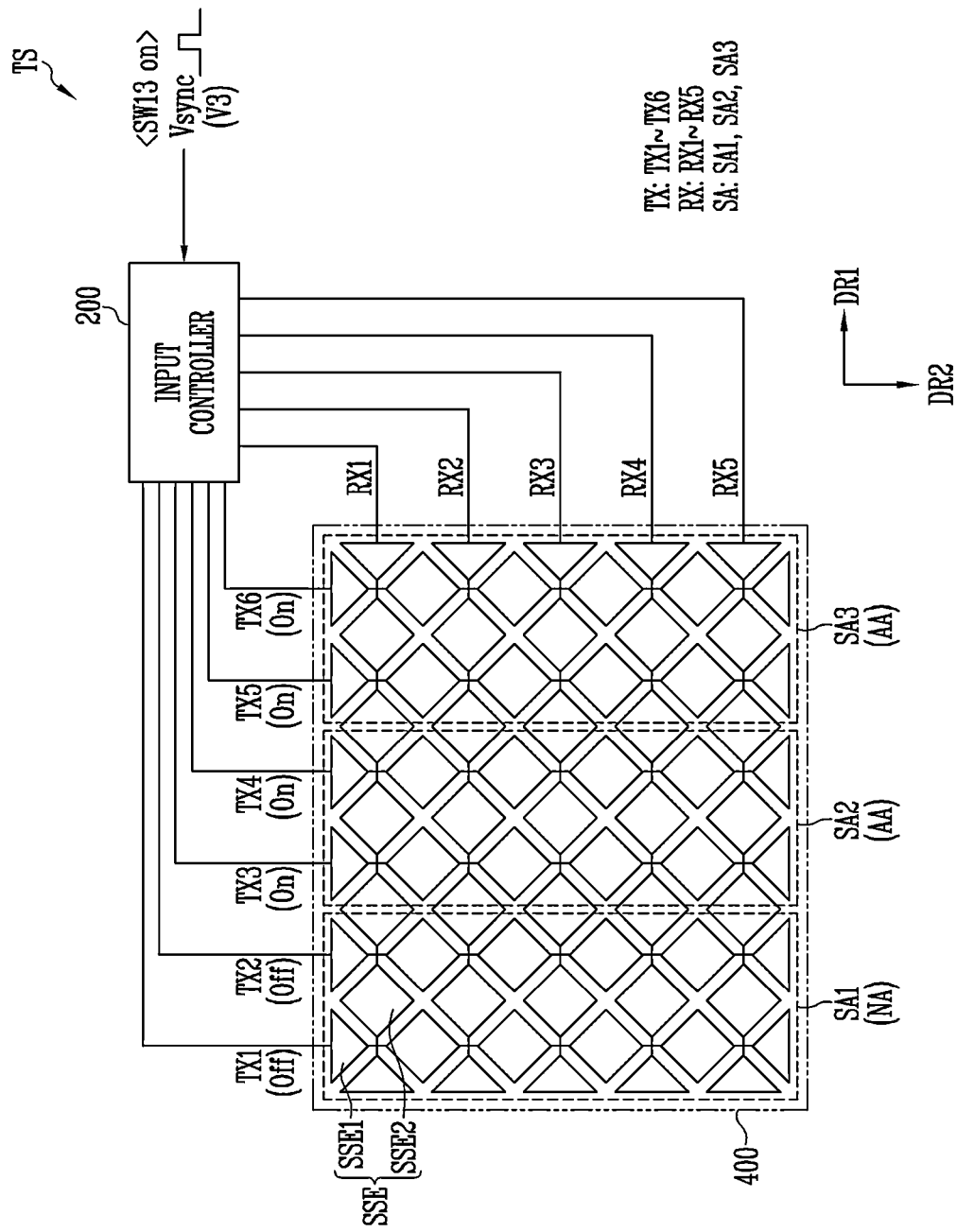
Figure 7C:
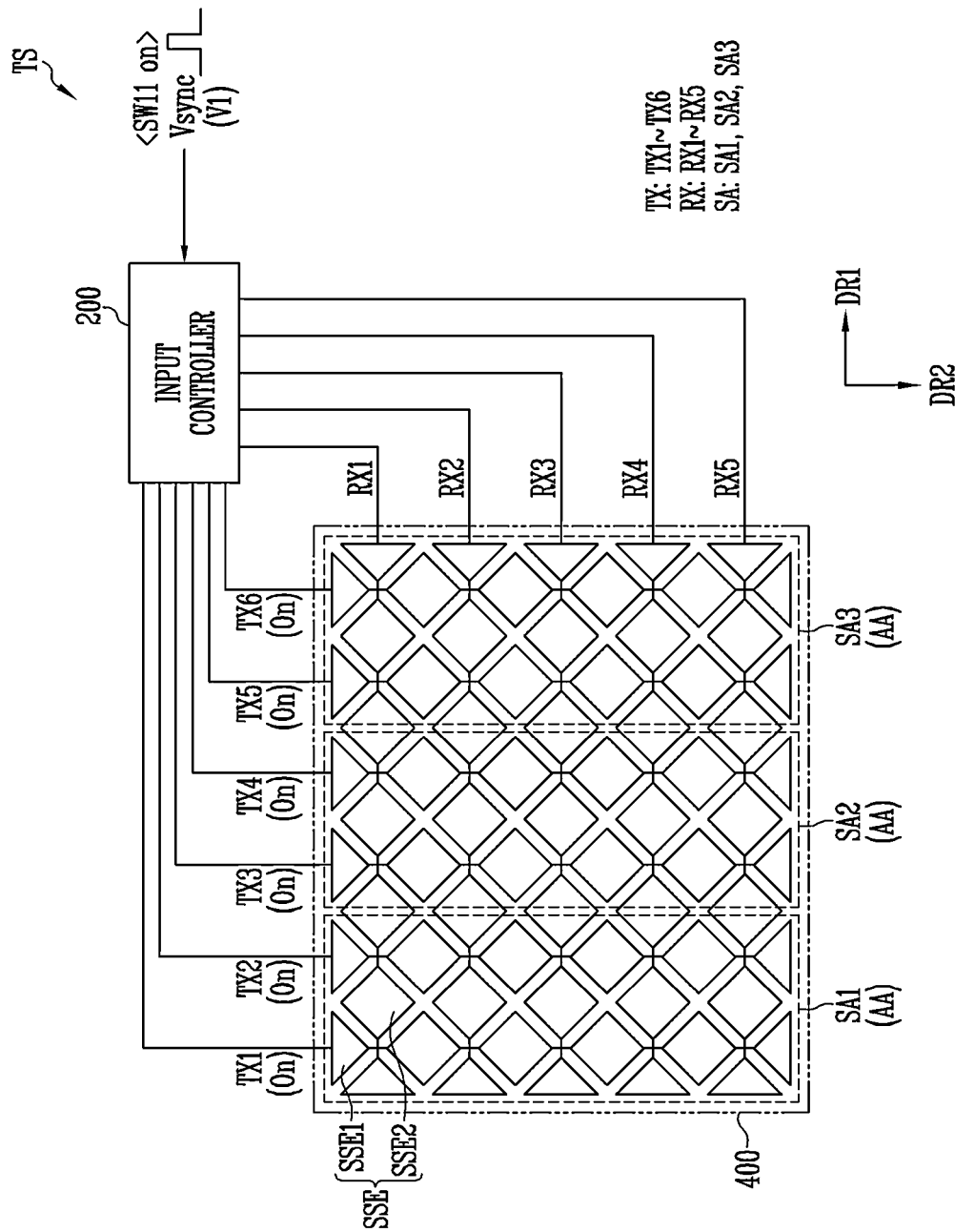

FIG. 5 is a diagram illustrating an embodiment of a touch sensor according to the invention. FIGS. 6A and 6B are diagrams for explaining an embodiment of an operation of the touch sensor of FIG. 5. FIGS. 7A to 7C are diagrams for explaining another embodiment of an operation of the touch sensor of FIG. 5. FIGS. 5 to 7C may be referred to in order to specifically describe the operation of the input controller 200. An embodiment in which the input controller 200 determines the non-active area based on the voltage level of the vertical synchronization signal Vsync will be described as an example. However, the invention is not limited thereto. The input controller 200 may determine the non-active area based on the voltage level of the horizontal synchronization signal Hsync, or determine the non-active area based on both the voltage level of the vertical synchronization signal Vsync and the voltage level of the horizontal synchronization signal Hsync.

Referring to FIG. 5, the touch sensor TS may include the input controller 200 and the touch panel 400.

The input controller 200 may supply the touch driving signal TX to sensing electrodes SSE of the touch panel 400, and receive the sensing signal RX output from the sensing electrodes SSE by the touch driving signal TX to detect whether the touch input has occurred and/or the position of the touch input.

The touch panel 400 may include a sensing area SA. Although not shown in FIG. 5, the touch panel 400 may further include the peripheral area described with reference to FIG. 1.

The plurality of sensing electrodes SSE may be provided on the sensing area SA. Signal lines and/or pads connecting the sensing electrodes SSE of the sensing area SA and the input controller 200 may be disposed on the peripheral area.

The sensing electrodes SSE may include first sensing electrodes SSE1 arranged in a second direction DR2. The first sensing electrodes SSE1 may be electrically connected to each other. In an embodiment, the first sensing electrodes SSE1 may constitute first sensing electrode lines extending in the second direction DR2, for example.

The sensing electrodes SSE may further include second sensing electrodes SSE2 arranged along a first direction DR1. The second sensing electrodes SSE2 may be electrically connected to each other along the first direction DR1. In an embodiment, the second sensing electrodes SSE2 may constitute second sensing electrode lines extending in the first direction DR1, for example.

In FIG. 5, the first and second sensing electrodes SSE1 and SSE2 are shown in a rhombus shape, but the invention is not limited thereto. The first and second sensing electrodes SSE1 and SSE2 may have other polygonal shapes. In addition, FIG. 5 shows six first sensing electrodes SSE1 arranged in the first direction DR1 and five second sensing electrodes SSE2 arranged in the second direction DR2. However, the number of the first and second sensing electrodes SSE1 and SSE2 is not limited thereto.

The first sensing electrode lines (e.g., sensing electrode columns) and the second sensing electrode lines (e.g., sensing electrode rows) may be connected to the input controller 200 through the signal lines, respectively. In an embodiment, one of the sensing electrode rows and the sensing electrode columns may receive the touch driving signal TX for sensing the touch input from the input controller 200 through the signal lines, and the other may transmit the sensing signal RX to the input controller 200 through the signal lines. In an embodiment, the first sensing electrodes SSE1 corresponding to the sensing electrode columns may receive touch driving signals TX1 to TX6 from the input controller 200 through the signal lines, respectively, for example. Also, the second sensing electrodes SSE2 corresponding to the sensing electrode rows may transmit sensing signals RX1 to RX5 to the input controller 200 through the signal lines, respectively.

In an embodiment, the input controller 200 may determine an area set as the non-active area among the sensing area SA based on the voltage level of the vertical synchronization signal Vsync, and may turn off the sensing electrodes SSE corresponding to the non-active area. In an embodiment, the input controller 200 may not provide the touch driving signal TX to the first sensing electrodes SSE1 corresponding to the non-active area, for example.

In an embodiment, referring to FIGS. 2, 3, 5 and 6A, as shown in FIG. 6A, the sensing area SA may be divided into a first sensing area SA1 and a second sensing area SA2, for example. Depending on the driving mode, in the first mode, the first sensing area SA1 of the sensing area SA may be set as a non-active area NA, and the second sensing area SA2 may be set as an active area AA.

The input controller 200 may determine the first sensing area SA1 as the non-active area NA and determine the second sensing area SA2 as the active area AA based on the voltage level of the vertical synchronization signal Vsync provided from the display driving controller 100. In an embodiment, depending on the driving mode, in the first mode, the display driving controller 100 may generate the vertical synchronization signal Vsync of a fourth voltage V4 by changing the voltage level (e.g., a first level) of the vertical synchronization signal Vsync of the first voltage V1 supplied from the outside, and provide the vertical synchronization signal Vsync of the fourth voltage V4 to the input controller 200, for example. The input controller 200 may determine the first sensing area SA1 as the non-active area NA based on the voltage level (e.g., a second level) of the vertical synchronization signal Vsync of the fourth voltage V4.

FIG. 6A shows a configuration in which the display driving controller 100 changes the vertical synchronization signal Vsync of the first voltage V1 to the vertical synchronization signal Vsync of the fourth voltage V4 according to the driving mode. However, this is merely an example, and the invention is not limited thereto. In an embodiment, the display driving controller 100 may change the vertical synchronization signal Vsync of the first voltage V1 to vertical synchronization signals Vsync of second, third, fifth, and sixth voltages V2, V3, V5, and V6, respectively, for example.

The input controller 200 may not provide touch driving signals TX1 to TX3 to the first sensing electrodes SSE1 corresponding to the first sensing area SA1 determined as the non-active area NA ('off' shown in FIG. 6A). Also, the input controller 200 may provide touch driving signals TX4 to TX6 to the first sensing electrodes SSE1 corresponding to the second sensing area SA2 determined as the active area AA ('on' shown in FIG. 6A).

Accordingly, the input controller 200 may detect whether the touch input corresponding to the active area AA (or the second sensing area SA2) has occurred and/or the position of the touch input based on the sensing signals RX1 to RX5 output from the second sensing electrodes SSE2. That is, the operation of sensing the touch input in the active area AA may be performed. At this time, since the touch driving signal TX may not be provided to the first sensing electrodes SSE1 corresponding to the first sensing area SA1 that is the non-active area NA, the operation of sensing the touch input in the non-active area NA may not be performed. Accordingly, power consumption may be reduced.

In an alternative embodiment, depending on the driving mode, in the second mode, the entire sensing area SA may be set as the active area AA. In an embodiment, referring to FIGS. 2, 3, 5 and 6B, as shown in FIG. 6B, in the second mode, all of first and second sensing areas SA1 and SA2 included in the sensing area SA may be set as the active area AA, for example. In this case, the display driving controller 100 may provide the vertical synchronization signal Vsync of the first voltage V1 to the input controller 200 without changing the voltage level of the vertical synchronization signal Vsync.

Based on the voltage level (or first level) of the vertical synchronization signal Vsync of the first voltage V1, the input controller 200 may determine the entire sensing area SA as the active area AA, and provide the touch driving signals TX1 to TX6 to the first sensing electrodes SSE1 corresponding to the entire sensing area SA (that is, the first sensing area SA1 and the second sensing area SA2) ('on' shown in FIG. 6B).

The positions and sizes of the active area AA and/or the non-active area NA shown in FIGS. 6A and 6B are examples, and the invention is not limited thereto. The areas set as the non-active area NA and the active area AA among the sensing area SA may be variously set according to the driving mode.

In an embodiment, as shown in FIGS. 7A to 7C, the sensing area SA may be divided into a first sensing area SA1, a second sensing area SA2, and a third sensing area SA3, for example. The input controller 200 may determine an area set as the non-active area NA among the first to third sensing areas SA1 to SA3.

In an embodiment, as shown in FIG. 7A, in the first mode, corresponding to an area that is not visually recognized by the user, the first sensing area SA1 and the second sensing area SA2 may be set as the non-active area NA, and the third sensing area SA3 may be set as the active area AA, for example. In this case, in response to the voltage level (e.g., a voltage level corresponding to the fifth voltage V5) of the vertical synchronization signal Vsync provided from the display driving controller 100, the input controller 200 may determine the first sensing area SA1 and the second sensing area SA2 as the non-active area NA, and may not provide the touch driving signals TX1 to TX4 to the first sensing electrodes SSE1 corresponding to the first sensing area SA1 and the second sensing area SA2 ('off' shown in FIG. 7A). Also, the input controller 200 may provide the touch driving signals TX5 and TX6 to the first sensing electrodes SSE1 corresponding to the third sensing area SA3 determined as the active area AA ('on' shown in FIG. 7A).

In another embodiment, as shown in FIG. 7B, in the first mode, corresponding to the area that is not visually recognized by the user, the first sensing area SA1 may be set as the non-active area NA, and the second sensing area SA2 and the third sensing area SA3 may be set as the active area AA. In this case, in response to the voltage level (e.g., a voltage level corresponding to the third voltage V3) of the vertical synchronization signal Vsync provided from the display driving controller 100, the input controller 200 may determine the first sensing area SA1 as the non-active area NA, and may not provide the touch driving signals TX1 to TX2 to the first sensing electrodes SSE1 corresponding to the first sensing area SA1 ('off' shown in FIG. 7B). Also, the input controller 200 may provide the touch driving signals TX3 to TX6 to the first sensing electrodes SSE1 corresponding to the second sensing area SA2 and the third sensing area SA3 determined as the active area AA ('on' shown in FIG. 7B).

As shown in FIG. 7C, depending on the driving mode, in the second mode, when all of the first to third sensing areas SA1 to SA3 are set as active areas AA, the display driving controller 100 may provide the vertical synchronization signal Vsync of the first voltage V1 to the input controller 200 without changing the voltage level of the vertical synchronization signal Vsync. In this case, the input controller 200 may provide the touch driving signals TX1 to TX6 to the first sensing electrodes SSE1 corresponding to the entire sensing area SA (that is, the first sensing area SA1, the second sensing area SA2, and the third sensing area SA3) ('on' shown in FIG. 7C).

As described with reference to FIGS. 2 to 7C, the display device DD according to the invention may reduce the power consumption by turning off the area corresponding to the non-active area NA among the sensing area SA according to the driving mode. In this case, a separate signal line for determining the non-active area NA may not be added between the display driving controller 100 and the input controller 200. The input controller 200 may determine the non-active area NA using the vertical synchronization signal Vsync and/or the horizontal synchronization signal Hsync whose voltage level is changed.

Figure 8A:
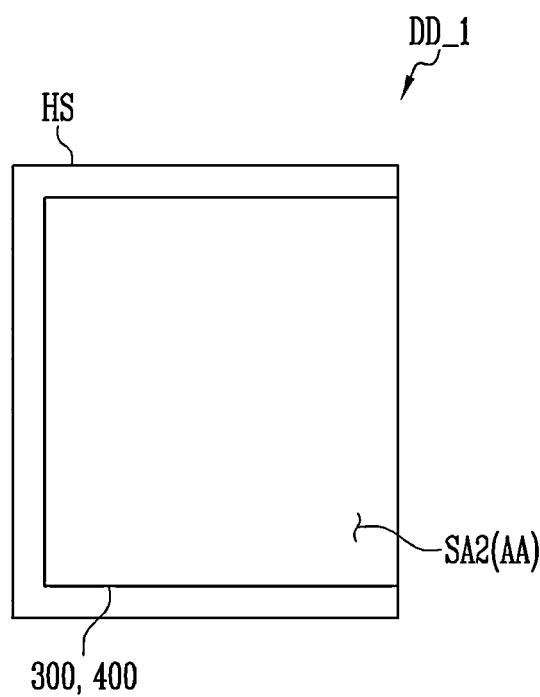
FIGS. 8A and 8B are diagrams for explaining an embodiment of a display device according to the operation of the touch sensor of FIG. 5.
Figure 8B:
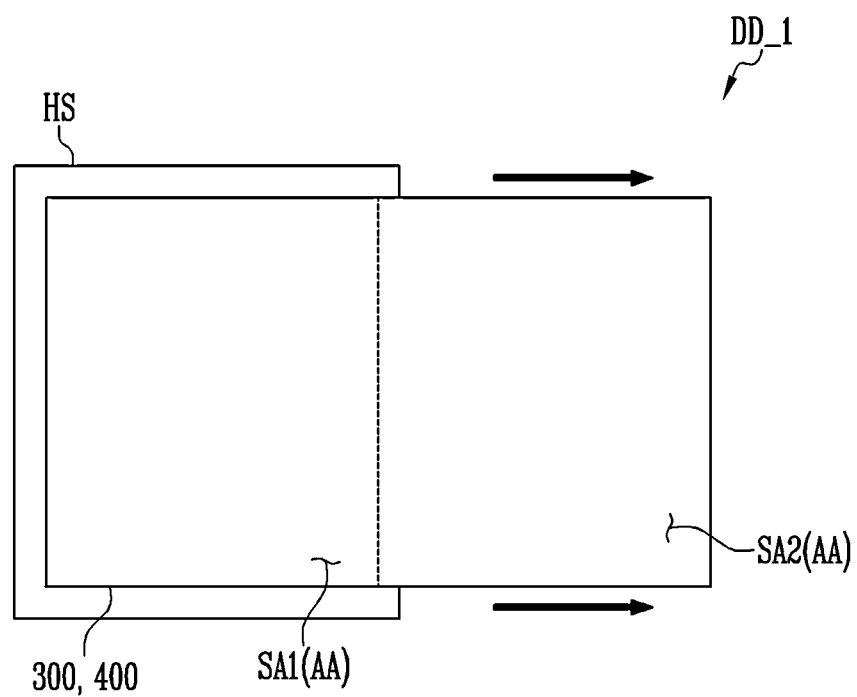

FIGS. 8A and 8B are diagrams for explaining an embodiment of a display device according to the operation of the touch sensor of FIG. 5.

FIGS. 8A and 8B show a display device DD_1 implemented as a slidable display device. In this case, a display panel 300 and a touch panel 400 of the display device DD_1 may be implemented including a flexible substrate for a sliding operation. In an embodiment, the flexible substrate included in the display panel 300 and the touch panel 400 may be one of a film substrate and a plastic substrate including a polymer organic material, for example. In an embodiment, the flexible substrate may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate, for example.

Referring to FIGS. 8A and 8B, the display device DD_1 may include a housing HS, a display panel 300, and a touch panel 400. The display panel 300 and the touch panel 400 may be substantially the same as the display panel 300 and the touch panel 400 described with reference to FIGS. 1 to 7C. In FIGS. 8A and 8B, the configurations of the display driving controller 100, the input controller 200, and the like shown in FIG. 1 are omitted for convenience of description. Also, in FIGS. 8A and 8B, the display panel 300 and the touch panel 400 are shown as one component for convenience of description. Hereinafter, the operation and configuration of the display device DD_1 will be described with reference to the touch panel 400 unless otherwise described.

The housing HS may be a member that accommodates and protects components of the display device DD_1 such as the display panel 300, the touch panel 400, and the like.

FIG. 8A shows a case in which a portion of the display panel 300 and the touch panel 400 is inserted into the housing HS according to the user's control. In this case, the display device DD_1 may deactivate a partial area of each of the display area of the display panel 300 and the sensing area of the touch panel 400 in response to the portion inserted into the housing HS. In an embodiment, an area of the display area of the display panel 300 that is inserted into the housing HS may be deactivated, and an area of the sensing area of the touch panel 400 that is inserted into the housing HS may be deactivated, for example.

Also, the display device DD_1 may determine an area that is not inserted into the housing HS (or an area visually recognized by the user) among the display area and the sensing area as the active area AA.

In an embodiment, as described with reference to FIGS. 2 to 5, and 6B, the input controller 200 of the display device DD_1 may determine the second sensing area SA2 of the sensing area as the active area AA, and determine the remaining area (e.g., the first sensing area SA1 of FIG. 6A) as the non-active area NA based on the voltage level of the vertical synchronization signal Vsync and/or the horizontal synchronization signal Hsync, for example. Here, the remaining area may correspond to the area inserted into the housing HS. The input controller 200 may not provide the touch driving signal (e.g., the touch driving signals TX1 to TX3 in FIG. 6A) to the first sensing electrodes SSE1 corresponding to the remaining area except for the second sensing area SA2 determined as the active area AA. Also, the input controller 200 may provide the touch driving signal (e.g., the touch driving signals TX4 to TX6 of FIG. 6A) to the first sensing electrodes SSE1 corresponding to the second sensing area SA2 determined as the active area AA.

FIG. 8B shows a case where the display panel 300 and the touch panel 400 maximally slide according to the user's control. In this case, the display device DD_1 may activate both the display area of the display panel 300 and the sensing area of the touch panel 400. In an embodiment, as described with reference to FIGS. 2 to 5, and 6B, the input controller 200 of the display device DD_1 may determine both the first sensing area SA1 and the second sensing area SA2 included in the sensing area as the active area AA based on the voltage level of the vertical synchronization signal Vsync and/or the horizontal synchronization signal Hsync, for example. The input controller 200 may provide the touch driving signal (e.g., the touch driving signals TX1 to TX6 of FIG. 6B) to the first sensing electrodes SSE1 corresponding to the first and second sensing areas SA1 and SA2 determined as the active area AA.

Figure 9A:
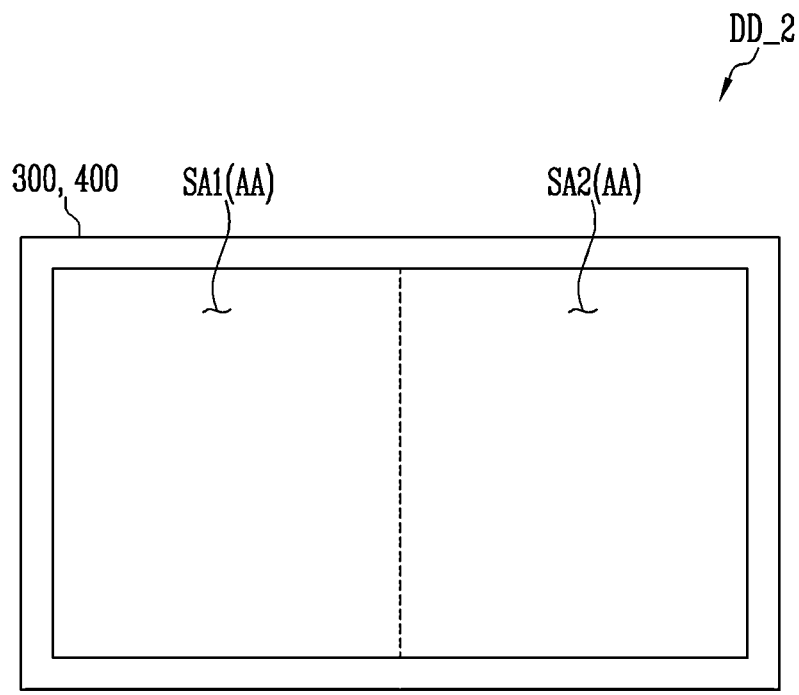
FIGS. 9A and 9B are diagrams for explaining another embodiment of a display device according to the operation of the touch sensor of FIG. 5.
Figure 9B:
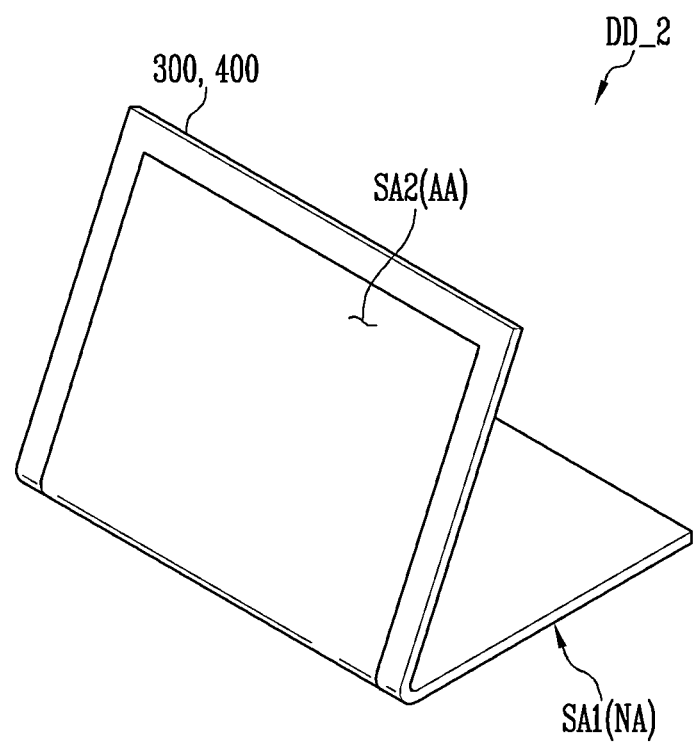

FIGS. 9A and 9B are diagrams for explaining another embodiment of a display device according to the operation of the touch sensor of FIG. 5. FIGS. 9A and 9B show a display device DD_2 implemented as a foldable display device.

Referring to FIGS. 9A and 9B, the display device DD_2 may include a display panel 300 and a touch panel 400. The display panel 300 and the touch panel 400 may be substantially the same as the display panel 300 and the touch panel 400 described with reference to FIGS. 1 to 7C. In FIGS. 9A and 9B, the configurations of the display driving controller 100, the input controller 200, and the like shown in FIG. 1 are omitted for convenience of description. Also, in FIGS. 9A and 9B, the display panel 300 and the touch panel 400 are shown as one component for convenience of description. Hereinafter, the operation and configuration of the display device DD_2 will be described with reference to the touch panel 400 unless otherwise described.

The display device DD_2 may be folded or unfolded according to the user's control.

In an embodiment, as shown in FIG. 9A, when the display device DD_2 is unfolded, the entire display area of the display panel 300 may be visually recognized by the user, for example. In this case, the display device DD_1 may activate both the display area of the display panel 300 and the sensing area of the touch panel 400. In an embodiment, as described with reference to FIGS. 2 to 5, and 6B, the input controller 200 of the display device DD_2 may determine both the first sensing area SA1 and the second sensing area SA2 included in the sensing area as the active area AA based on the voltage level of the vertical synchronization signal Vsync and/or the horizontal synchronization signal Hsync, for example. The input controller 200 may provide the touch driving signal (e.g., the touch driving signals TX1 to TX6 of FIG. 6B) to the first sensing electrodes SSE1 corresponding to the first and second sensing areas SA1 and SA2 determined as the active area AA.

In another embodiment, as shown in FIG. 9B, when the display device DD_2 is folded, the display device DD_2 may deactivate a partial area of each of the display area of the display panel 300 and the sensing area of the touch panel 400 in response to an area that is not visually recognized by the user due to the folding operation.

Also, the display device DD_2 may determine an area visually recognized by the user among the display area and the sensing area as the active area AA.

In an embodiment, as described with reference to FIGS. 2 to 5, and 6A, the input controller 200 of the display device DD_2 may determine the second sensing area SA2 of the sensing area as the active area AA and determine the first sensing area SA1 as the non-active area NA based on the voltage level of the vertical synchronization signal Vsync and/or the horizontal synchronization signal Hsync, for example. The input controller 200 may not provide the touch driving signal (e.g., the touch driving signals TX1 to TX3 of FIG. 6A) to the first sensing electrodes SSE1 corresponding to the first sensing area SA1 determined as the non-active area NA. Also, the input controller 200 may provide the touch driving signal (e.g., the touch driving signals TX4 of TX6 of FIG. 6A) to the first sensing electrodes SSE1 corresponding to the second sensing area SA2 determined as the active area AA.

Figure 10A:
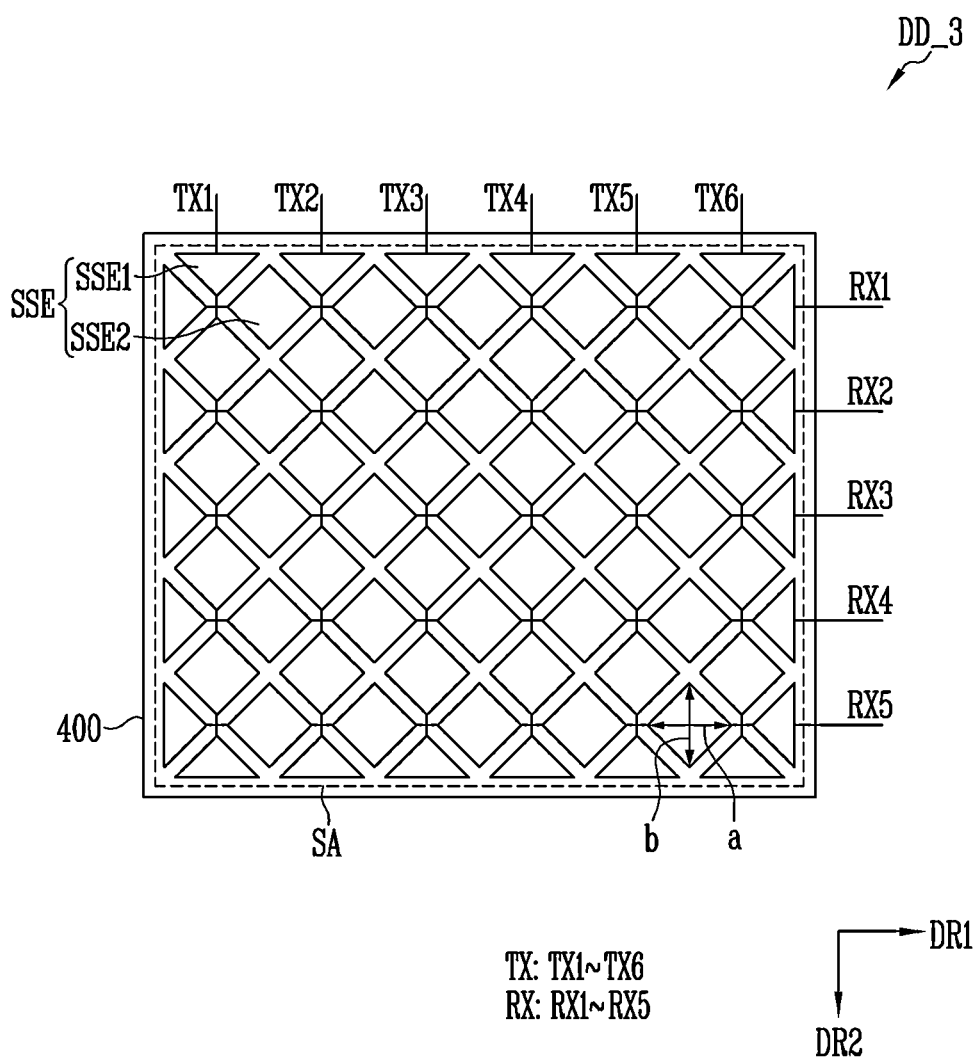
FIGS. 10A and 10B are diagrams for explaining still another embodiment of a display device according to the operation of the touch sensor of FIG. 5.
Figure 10B:
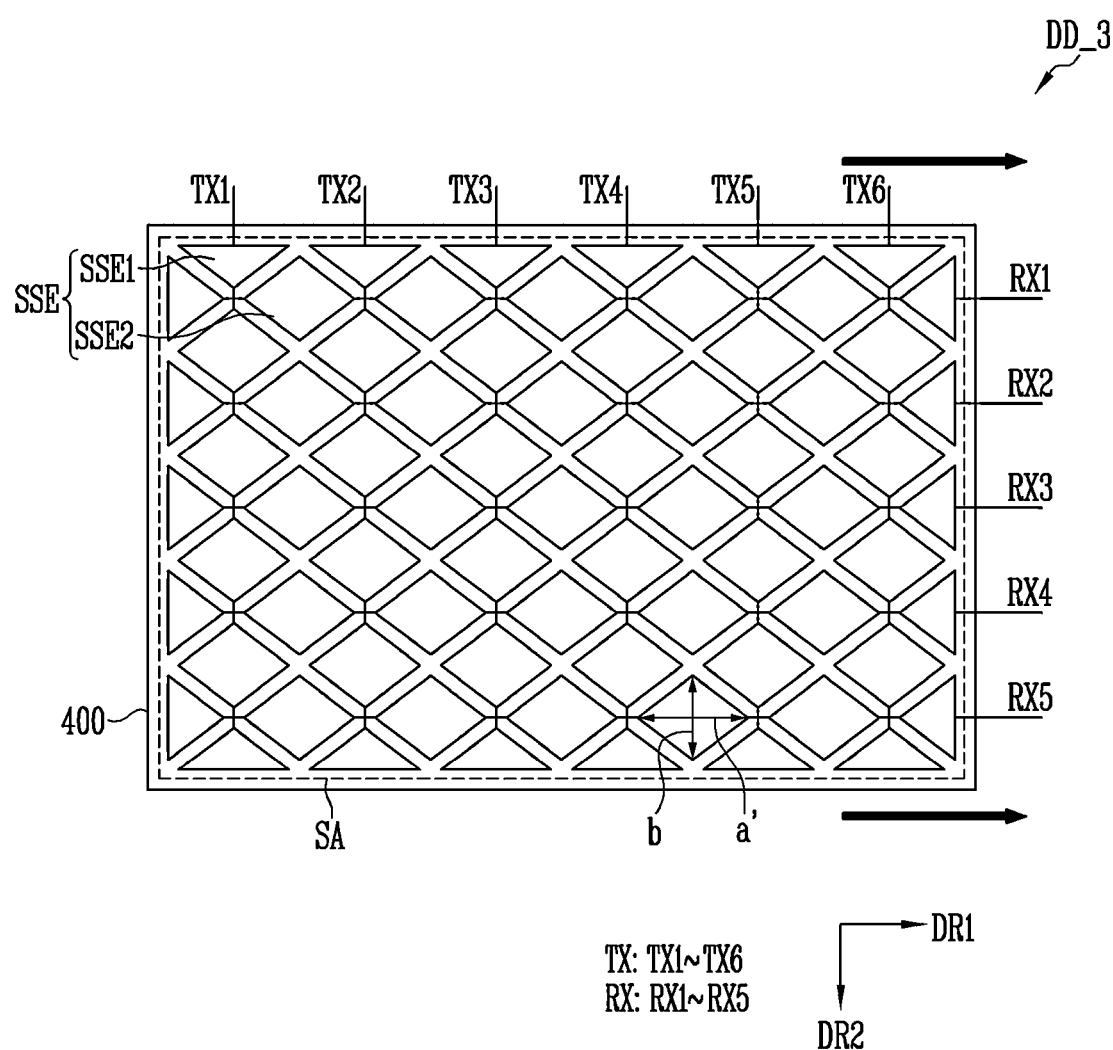

FIGS. 10A and 10B are diagrams for explaining still another embodiment of a display device according to the operation of the touch sensor of FIG. 5. FIGS. 10A and 10B show a display device DD_3 implemented as a stretchable display device. A touch panel 400 may be substantially the same as the touch panel 400 described with reference to FIGS. 1 to 7C. For convenience of description, only the touch panel 400 is shown in FIGS. 10A and 10B, and the configurations of the display panel 300, the display driving controller 100, the input controller 200, and the like shown in FIG. 1 are omitted.

Referring to FIGS. 1, 10A and 10B, the display device DD_3 may include a touch panel 400, and the touch panel 400 may have elasticity so that the touch panel 400 may be stretched.

According to the user's control, the display device DD_3, as shown in FIG. 10A, may be in a normal state (or isotropic state) in which a first length a corresponding to the first direction DR1 of the sensing electrode SSE and a second length b corresponding to the second direction DR2 are the same. In an alternative embodiment, the display device DD_3, as shown in FIG. 10B, may be in a stretched state (or anisotropic state) in which a first length a' corresponding to the first direction DR1 of the sensing electrode SSE and a second length b corresponding to the second direction DR2 are different from each other as the touch panel 400 is stretched along the first direction DR1.

In the normal state or the stretched state of the display device DD_3, a calculation method for detecting the touch position according to the touch input may be different. In an embodiment, as shown in FIG. 10B, when the first length a' and the second length b of the sensing electrode SSE are different as the display device DD_3 is stretched along the first direction DR1, the input controller 200 may apply different algorithms to detect the touch position based on the sensing signal RX received from the sensing electrode SSE, for example.

In this case, depending on the degree of stretching, the display device DD_3 may change the voltage level of the vertical synchronization signal Vsync and/or the horizontal synchronization signal Hsync. In an embodiment, when the display device DD_3 is in the normal state, the display device DD_3 may provide the vertical synchronization signal Vsync and/or the horizontal synchronization signal Hsync having the first level to the input controller 200 without changing the voltage level of the vertical synchronization signal Vsync and/or the horizontal synchronization signal Hsync, for example. In another embodiment, when the display device DD_3 is in the stretched state, the display device DD_3 may generate the vertical synchronization signal Vsync and/or the horizontal synchronization signal Hsync having the second level by changing the voltage level of the vertical synchronization signal Vsync and/or the horizontal synchronization signal Hsync having the first level, and provide the vertical synchronization signal Vsync and/or the horizontal synchronization signal Hsync having the second level to the input controller 200.

The input controller 200 may determine the degree of stretching of the display device DD_3 based on the voltage level of the vertical synchronization signal Vsync and/or the horizontal synchronization signal Hsync, and adaptively apply the algorithm for detecting the touch position accordingly. In an embodiment, the input controller 200 may determine that the display device DD_3 is in the normal state based on the vertical synchronization signal Vsync and/or the horizontal synchronization signal Hsync having the first level, and detect the touch position by applying the algorithm for detecting the touch position corresponding to the normal state, for example. In another embodiment, the input controller 200 may determine that the display device DD_3 is in the stretched state based on the vertical synchronization signal Vsync and/or the horizontal synchronization signal Hsync having the second level, and detect the touch position by applying the algorithm for detecting the touch position corresponding to the stretched state.

The display device in the embodiments of the invention may turn off the area corresponding to the non-active area among the sensing area based on voltage level of the vertical synchronization signal and/or the horizontal synchronization signal. Accordingly, the power consumption due to driving touch sensor may be reduced.

However, the effects of the invention are not limited to the above-described effects, and may be variously extended without departing from the spirit and scope of the invention.

The foregoing detailed descriptions may illustrate and describe the invention. In addition, the foregoing descriptions merely illustrate and describe the preferred embodiment of the invention. As described above, the invention may be used in various different combinations, modifications and environments, and may be changed or modified within the scope of the invention disclosed in this specification, the scope equivalent to the above-described description and/or the scope of technology or knowledge of the art. Therefore, the description is not intended to limit the disclosure to the form disclosed herein. In addition, the appended claims should be construed as including other embodiments.

What is claimed is:

1. A display device comprising:
   a display driving controller which receives input image data, a synchronization signal, and a voltage control signal from outside, and generates image data based on the input image data and the synchronization signal;
   a display panel which includes a plurality of pixels disposed on a display area and displays an image on the display area based on the image data; and
   a touch sensor which includes a plurality of sensing electrodes disposed on a sensing area, and detects a touch input generated in the sensing area by driving the plurality of sensing electrodes,
   wherein the display driving controller generates a second level of the synchronization signal by changing a voltage level of the synchronization signal having a first level based on the voltage control signal, and provides the synchronization signal having the second level to the touch sensor, and
   wherein the touch sensor deactivates at least a partial area of the sensing area in response to the synchronization signal having the second level while a remaining area of the sensing area stays active to detect the touch input and the display panel displays the image.

2. The display device of claim 1, wherein the touch sensor includes:
   an input controller which generates touch driving signals and supplies the touch driving signals to the plurality of sensing electrodes; and
   a touch panel including the plurality of sensing electrodes, and
   wherein the input controller detects the touch input based on sensing signals output from the plurality of sensing electrodes in response to the touch driving signals.

3. The display device of claim 2, wherein the sensing area includes a first sensing area and a second sensing area, and
   wherein the input controller supplies the touch driving signals to the plurality of sensing electrodes disposed in the second sensing area in response to the synchronization signal having the second level, and does not supply the touch driving signals to the plurality of sensing electrodes disposed in the first sensing area.

4. The display device of claim 1, further comprising:
   a synchronization signal line which connects the display driving controller and the touch sensor, and transmits the synchronization signal.

5. The display device of claim 4, wherein the display driving controller includes a voltage level controller which is electrically connected to one end of the synchronization signal line, and generates the synchronization signal having the second level by changing the voltage level of the synchronization signal having the first level.

6. The display device of claim 5, wherein the voltage level controller includes:
   a plurality of resistors connected in series between an input terminal to which the synchronization signal is input and a ground electrode; and
   a plurality of switching elements connected between each node between the plurality of resistors and the one end of the synchronization signal line.

7. The display device of claim 1, wherein the synchronization signal is a vertical synchronization signal or a horizontal synchronization signal.

8. The display device of claim 2, wherein the input controller supplies the touch driving signals to the plurality of sensing electrodes so as not to overlap with a period in which the synchronization signal is provided to the display driving controller.

9. The display device of claim 3, wherein the second sensing area corresponds to an active area which is visually recognized by a user, and the first sensing area corresponds to a non-active area which is not visually recognized by the user.

10. The display device of claim 2, wherein the plurality of sensing electrodes include:
    first sensing electrodes disposed along a first direction; and
    second sensing electrodes disposed along a second direction different from the first direction, and
    wherein the input controller supplies the touch driving signals to the first sensing electrodes, and detects the touch input based on the sensing signals output from the second sensing electrodes according to a mutual capacitance method or a self-capacitance method between the first sensing electrodes and the second sensing electrodes.

11. The display device of claim 1, wherein each of the display panel and the touch sensor includes a flexible substrate.

12. The display device of claim 1, wherein the touch sensor adaptively detects a touch position of the touch input in response to the voltage level of the synchronization signal.

13. A display device comprising:
    a display driving controller which receives input image data, a synchronization signal, and a voltage control signal from outside, and generates image data based on the input image data and the synchronization signal;
    a display panel which includes a plurality of pixels disposed on a display area and displays an image on the display area based on the image data; and
    a touch sensor which includes a plurality of sensing electrodes disposed on a sensing area, and detects a touch input generated in the sensing area by driving the plurality of sensing electrodes,
    wherein the display driving controller generates a second level of the synchronization signal by changing a voltage level of the synchronization signal having a first level based on the voltage control signal, and provides the synchronization signal having the second level to the touch sensor, and
    wherein the touch sensor adaptively detects a touch position of the touch input on an entirety of the sensing area or a partial area less than an entirety of the sensing area less based on the synchronization signal having the first level or the second level while the display panel displays the image.

14. The display device of claim 13, wherein the touch sensor includes:
    an input controller which generates touch driving signals and supplies the touch driving signals to the plurality of sensing electrodes; and
    a touch panel including the plurality of sensing electrodes, and
    wherein the input controller detects the touch input based on sensing signals output from the plurality of sensing electrodes in response to the touch driving signals.

15. The display device of claim 13, further comprising:
a synchronization signal line which connects the display driving controller and the touch sensor, and transmits the synchronization signal.

16. The display device of claim 15, wherein the display driving controller includes a voltage level controller which is electrically connected to one end of the synchronization signal line, and generates the synchronization signal having the second level by changing the voltage level of the synchronization signal having the first level.

17. The display device of claim 16, wherein the voltage level controller includes:
a plurality of resistors connected in series between an input terminal to which the synchronization signal is input and a ground electrode; and
a plurality of switching elements connected between each node between the plurality of resistors and the one end of the synchronization signal line.

18. The display device of claim 13, wherein the synchronization signal is a vertical synchronization signal or a horizontal synchronization signal.

19. The display device of claim 13, wherein the touch sensor deactivates at least a partial area of the sensing area in response to the synchronization signal having the second level.

* * * * *